US008090670B2

(12) United States Patent
Sridhar et al.

(10) Patent No.: US 8,090,670 B2
(45) Date of Patent: Jan. 3, 2012

(54) SYSTEM AND METHOD FOR REMOTE USAGE MODELING

(75) Inventors: Varadarajan Sridhar, Bangalore (IN); Amit Thawani, Bangalore (IN); Kamakhya Prasad Gupta, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 671 days.

(21) Appl. No.: 12/234,166

(22) Filed: Sep. 19, 2008

(65) Prior Publication Data

US 2010/0073496 A1    Mar. 25, 2010

(51) Int. Cl.
*G06F 17/00* (2006.01)
*G06N 5/00* (2006.01)
(52) U.S. Cl. .......................................... 706/45
(58) Field of Classification Search ...................... 706/45
See application file for complete search history.

(56) References Cited

U.S. PATENT DOCUMENTS

| 6,286,140 | B1 | 9/2001 | Ivanyi |
| 6,381,507 | B1 * | 4/2002 | Shima et al. ................... 700/83 |
| 7,092,926 | B2 | 8/2006 | Cerrato |
| 7,260,823 | B2 | 8/2007 | Schlack et al. |

OTHER PUBLICATIONS

Development of the IT Convergence Using Power Line Communication, Jung-Sook Kim; Computer and Information Science (ICIS), 2010 IEEE/ACIS 9th International Conference on Digital Object Identifier: 10.1109/ICIS.2010.46 Publication Year: 2010 , pp. 696-701.*
Class phrase models for language modeling, Ries, K.; Finn Dag Buo; Waibel, A.; Spoken Language, 1996. ICSLP 96. Proceedings., Fourth International Conference on Volume: 1 Digital Object Identifier: 10.1109/ICSLP.1996.607138 Publication Year: 1996 , pp. 398-401 vol. 1.*
Intelligent control of the lift model, Cernys, P.; Kubilius, V.; Macerauskas, V.; Ratkevicius, K.; Intelligent Data Acquisition and Advanced Computing Systems: Technology and Applications, 2003. Proceedings of the Second IEEE International Workshop on Digital Object Identifier: 10.1109/IDAACS.2003.1249600 Publication Year: 2003 , pp. 428-431.*
Development of the intelligent dust chamber bag control system using Case-Based reasoning, Kim, Jung-Sook; Information Sciences and Interaction Sciences (ICIS), 2010 3rd International Conference on Digital Object Identifier: 10.1109/ICICIS.2010.5534766 Publication Year: 2010 , pp. 546-551.* Milani, et al., "Modeling User Behaviour by Planning", Proceedings of World Academy of Science, Engineering and Technology, vol. 28, Apr. 2008.
Lim, et al., "A Target Advertisement System Based on TV Viewer's Profile Reasoning", Multimedia Tools and Applications Journal, vol. 36, Nos. 1-2 , Jan., 2008, Springer Netherlands.
Ezeife, et al., "SSM: A Frequent Sequential Data Stream Patterns Miner", Proceedings of the IEEE Symposium on Computational Intelligence and Data Mining, 2007 (CIDM 2007), Honolulu, Hawaii, USA, Apr. 1-5, 2007.

* cited by examiner

*Primary Examiner* — Michael B Holmes
(74) *Attorney, Agent, or Firm* — Merek, Blackmon & Voorhees LLC

(57)    ABSTRACT

Remote control units are used to interact with a variety of devices. Modeling of the usage of a remote control unit while interacting with a device helps in (a) redesigning the remote for better usability; (b) dynamic adapting of the remote to provide improved interactions; and (c) characterizing the usage behaviors. In particular, it is very popular to use remote control units to interact with TVs and PVR devices. A system and method for the modeling of a remote usage involves the use of both pre-defined models and discovered models. Specifically, a pattern of usage of a remote control unit is abstracted to be one of either a pre-defined model or a discovered model. The model discovery involves the process of generalization based on a set of particular remote control unit usage patterns. The labels associated with the models help in characterizing the remote control unit usage patterns.

16 Claims, 16 Drawing Sheets

An Illustrative TV/STB Scenario

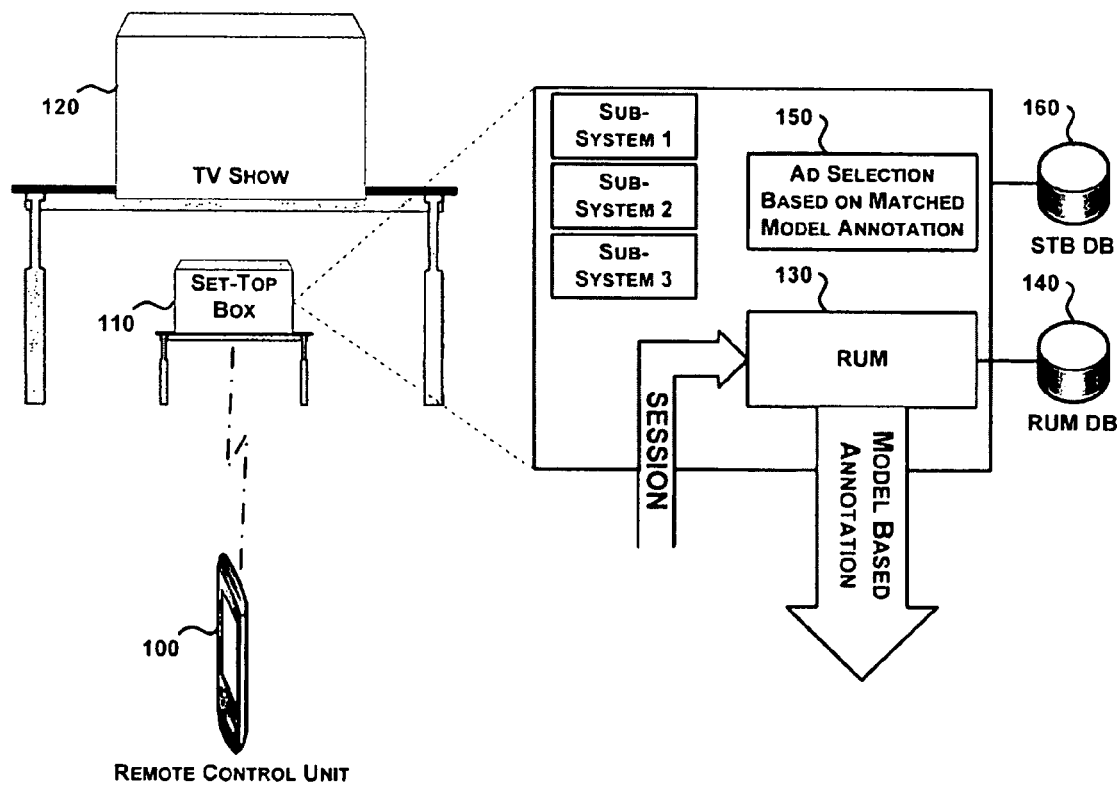
FIG. 1: AN ILLUSTRATIVE TV/STB SCENARIO

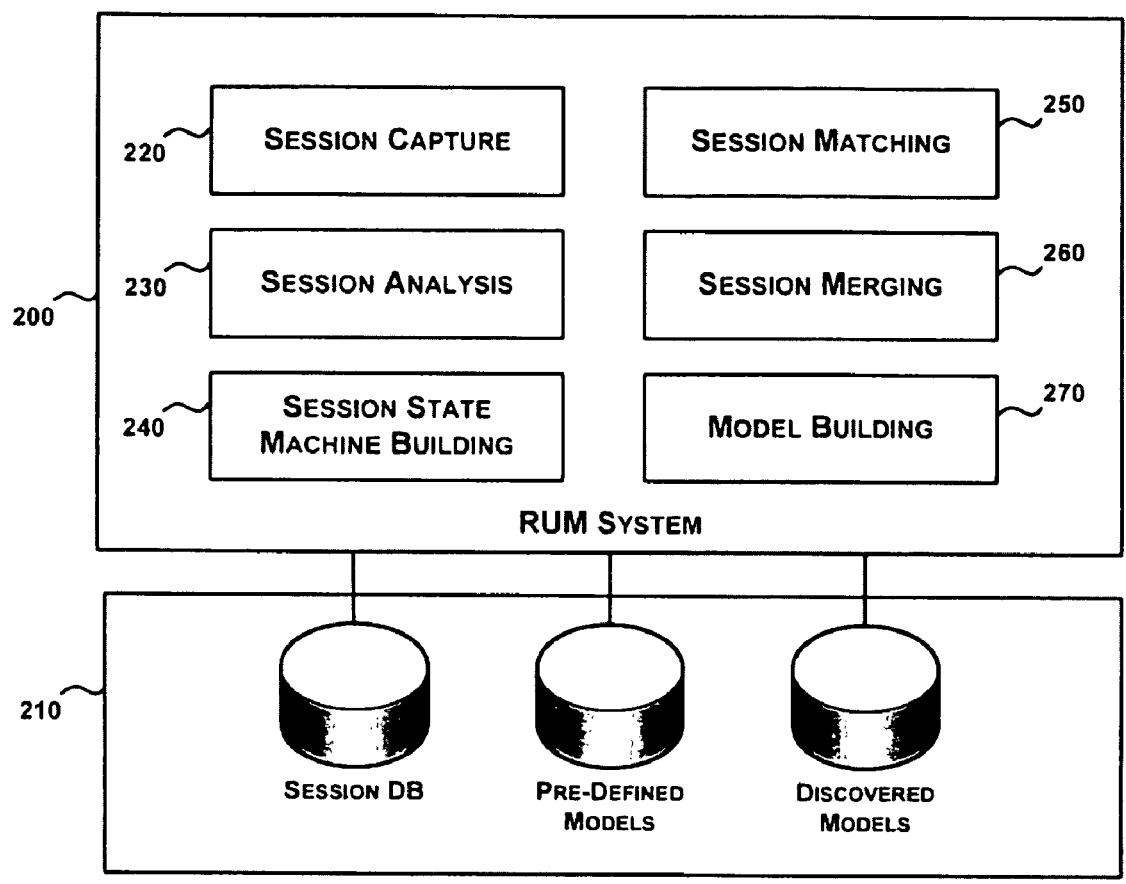
FIG. 2: REMOTE USAGE MODELING SYSTEM

| Remote Events - Basic | | | |
|---|---|---|---|
| A/V-SOURCE | INFO | PLAY | SYNOPSIS |
| ASPECT | JUMP | POWER-OFF | TIMER |
| BACKWARD | LEFT | POWER-ON | TOP |
| BOTTOM | MENU | RECORD | VISUAL-TYPE |
| CHANNEL- | MUTE | RIGHT | VOLUME- |
| CHANNEL+ | OK | SOUND-SETTINGS | VOLUME+ |
| EPG | PICTURE-IN/OUT | SOUND-TYPE | ZOOM |
| FORWARD | PICTURE-SETTINGS | SWAP | |

300

| META-EVENT NAME | EVENT |
|---|---|
| APPLICATION-LOAD | EPG, MENU, SOUND-SETTINGS, PICTURE-SETTINGS |
| BROWSE | LEFT, RIGHT, UP, DOWN, EPG |
| CHANNEL-CHANGE | CHANNEL-, CHANNEL+, A/V SOURCE |
| CHANNEL-SELECTION | JUMP, SWAP, 0,1,2,..9, PIP |
| CONTENT-BROWSE | RECORD, PLAY, FORWARD, BACKWARD |
| DISPLAY | PICTURE-SETTINGS, ZOOM, ASPECT-RATIO |
| INFORMATION | LANGUAGE, SYNOPSIS, INFO |
| SESSION | POWER-ON, POWER-OFF, TIMER |
| SOUND | VOLUME+, VOLUME-, MUTE, SOUND-SETTINGS |
| STORE | RECORD, PAUSE, STOP |

310

| Psychological States in TV Viewing | | |
|---|---|---|
| ASSESSED-VIEWING | IDLE-VIEWING | PARALLEL-VIEWING |
| CLASH-VIEWING | LEISURELY-WATCH | RESTLESSNESS |
| DOESN'T-BOTHER-VIEWING | LIKED-CHANNEL-WATCH | SILENT-VIEWING |
| FOCUSED-WATCH | MULTI-MODAL-WATCH | TIMED-VIEWING |
| FRUSTRATED | NOT-TO-MISS-VIEWING | |

320

FIG. 3: ILLUSTRATIVE BASIC EVENTS AND META-EVENTS

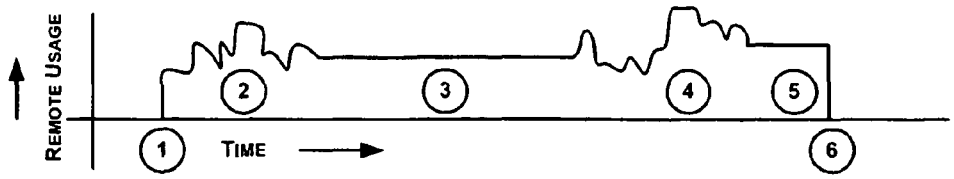

Fig. 3a: Illustrative Session Characterization

Representation of Session and Remote State Machine (RSM)

Session:
(A) Consider a remote control unit usage behavior depicted in Fig. 3a.
(B) Figure depicts activities performed using the remote between power-on (indicated by circled 1) and power-off (indicated by circled 6);
(C) There is a brief period of hyper-activity of remote usage (circled 2) before a significant period of remote inactivity (circled 3);
(D) This follows another period of hyper-activity (circled 4), and a brief period of inactivity (circled 5) before power-off;
(E) Given this, a session is defined as a period of remote activity followed by a period of remote inactivity;
(F) Examples include: Circled 1, 2, and 3 form a session and circled 4, 5, and 6 form another session;
(G) Some times, it is useful to have a lower bound on the duration: Time period of circled 3 to be greater than a pre-defined threshold;
(H) Each basic event has a time-stamp, label, and one or more attributes;
(I) Session data is a sequence of basic events wherein each basic event is a remote key press down to press up;
A basic event is represented as
    <EventID, StartTime, EndTime, InitialAttributes, FinalAttributes>;
    Note that attribute values are optional;

Session State Machine:
(A) This is based on Remote State Machine (RSM): an RSM is a multi-level graph wherein there is a labeled and weighted graph at each level (hierarchical state machines);
(B) In a typical representation, there are two levels:
(B1) Level 1 (L1) RSM is based on meta-events with each node in L1 representing a meta-event;
(B2) Level 2 (L2) RSM is based on basic events in which each node stands for a basic event;
(B3) Each L2 RSM is associated with a node of an L1 RSM and hence, basic events of an L2 RSM are bound by a meta-event;
(B4) Each node in an RSM has three attributes <N, T, E>: N – stands for number visits to the node during a session; T – stands for an aggregated time of visits; and E – stands for the number of edges at N;

Fig. 3b: Illustrative Representations – Session and RSM

```
SESSION 1 DATA:
<SESSION=POWER ON>
<SUBSESSION> //1A
<META EVENT=APPLICATION LOAD>
<EVENT NAME=EPG START TIME=0 END TIME=5</EVENT>
</META EVENT>
<META EVENT=BROWSE>
<EVENT NAME=UP START TIME=205 END TIME=206</EVENT>
<EVENT NAME=UP START TIME=228 END TIME=233</EVENT>
</META EVENT>
<META EVENT=APPLICATION LOAD>
<EVENT NAME=EPG START TIME=384 END TIME=386</EVENT>
</META EVENT>
<META EVENT=BROWSE>
<EVENT NAME=DOWN START TIME=728 END TIME=732</EVENT>
<EVENT NAME=DOWN START TIME=756 END TIME=758</EVENT>
<EVENT NAME=UP START TIME=841 END TIME=843</EVENT>
<EVENT NAME=DOWN START TIME=862 END TIME=867</EVENT>
<EVENT NAME=EPG START TIME=888 END TIME=890</EVENT>
<META EVENT=CHANNEL CHANGE>
<EVENT NAME=CHANNEL - START TIME=912 END TIME=916</EVENT>
<EVENT NAME=CHANNEL + START TIME=946 END TIME=947</EVENT>
<EVENT NAME=CHANNEL + START TIME=977 END TIME=979</EVENT>
</META EVENT>
<META EVENT=APPLICATION LOAD>
<EVENT NAME=EPG START TIME=384 END TIME=386</EVENT>
<META EVENT=BROWSE>
<EVENT NAME=EPG START TIME=1101 END TIME=1106</EVENT>
</META EVENT>
<META EVENT=CHANNEL CHANGE>
<EVENT NAME=CHANNEL + START TIME=946 END TIME=947</EVENT>
<EVENT NAME=CHANNEL + START TIME=1201 END TIME=1202</EVENT>
<EVENT NAME=CHANNEL + START TIME=1208 END TIME=1210</EVENT>
</META EVENT>
<SUBSESSION>
<SUBSESSION> //1B
<META EVENT=CHANNEL SELECTION>
<EVENT NAME= JUMP START TIME=2370 END TIME=2375</EVENT>
<EVENT NAME=PIP START TIME=2401 END TIME=2405</EVENT>
<EVENT NAME=SWAP START TIME=2434 END TIME=2436</EVENT>
<EVENT NAME=PIP START TIME=2452 END TIME=2456</EVENT>
<EVENT NAME=PIP START TIME=2486 END TIME=2488</EVENT>
</META EVENT>
<META EVENT=SOUND>
<EVENT NAME=VOLUME - START TIME=2559 END TIME=2562</EVENT>
<EVENT NAME= VOLUME + START TIME=2583 END TIME=2587</EVENT>
<EVENT NAME= VOLUME + START TIME=2614 END TIME=2615</EVENT>
<EVENT NAME=VOLUME - START TIME=2639 END TIME=2640</EVENT>
</META EVENT>
<META EVENT=CHANNEL SELECTION>
<EVENT NAME=PIP START TIME=2879 END TIME=2881</EVENT>
<SUBSESSION>
<SESSION=POWER OF>
```

FIG. 4: AN ILLUSTRATIVE DATA SET – SESSION 1

```
SESSION 2 DATA:

<SESSION=POWER ON>
<SUBSESSION> //2A
<META EVENT=CHANNEL SELECTION> <EVENT NAME=PIP START TIME=0 END TIME=3</EVENT>
<EVENT NAME=PIP START TIME=20 END TIME=23</EVENT>
<EVENT NAME=PIP START TIME=185 END TIME=187</EVENT>
<EVENT NAME= JUMP START TIME=215 END TIME=218</EVENT>
<EVENT NAME=SWAP START TIME=241 END TIME=243</EVENT>
<EVENT NAME=PIP START TIME=267 END TIME=271</EVENT>
<EVENT NAME= JUMP START TIME=287 END TIME=291</EVENT> </META EVENT>
<META EVENT=STORE> <EVENT NAME=PAUSE START TIME=315 END TIME=320</EVENT>
<EVENT NAME=PLAY START TIME=401 END TIME=403</EVENT>
<EVENT NAME=STOP START TIME=429 END TIME=433</EVENT>
<EVENT NAME=STOP START TIME=484 END TIME=487</EVENT>
<EVENT NAME=PAUSE START TIME=506 END TIME=508</EVENT> </META EVENT>
<META EVENT=CONTENT> <EVENT NAME=RECORD START TIME=535 END TIME=540</EVENT>
<EVENT NAME=BACKWARD START TIME=565 END TIME=569</EVENT>
<EVENT NAME=RECORD START TIME=596 END TIME=597</EVENT> </META EVENT>
<META EVENT=STORE> <EVENT NAME=PLAY START TIME=675 END TIME=680</EVENT>
<EVENT NAME=PUASE TIME=715 END TIME=717</EVENT>
<EVENT NAME=PLAY START TIME=737 END TIME=739</EVENT>
<EVENT NAME=PAUSE START TIME=754 END TIME=757</EVENT> </META EVENT>
<META EVENT=CONTENT> <EVENT NAME=RECORD START TIME=841 END TIME=845</EVENT>
<EVENT NAME=BACKWARD START TIME=863 END TIME=865</EVENT>
<EVENT NAME=FORWARD START TIME=908 END TIME=909</EVENT>
<EVENT NAME=PLAY START TIME=1083 END TIME=1085</EVENT>
<EVENT NAME=FORWARD START TIME=1103 END TIME=1104</EVENT>
<EVENT NAME=PLAY START TIME=1123 END TIME=1125</EVENT>
<META EVENT=INFORMATION> <EVENT NAME=LANGUAGE START TIME=1154 END TIME=1158</EVENT>
<EVENT NAME=SYNOPSIS START TIME=1178 END TIME=1181</EVENT>
<EVENT NAME=LANGUAGE START TIME=1210 END TIME=1214</EVENT>
<EVENT NAME=LANGUAGE START TIME=1237 END TIME=1241</EVENT> </META EVENT>
<SUBSESSION>
<SUBSESSION> //2B
<META EVENT=APPLICATION LOAD>
<EVENT NAME=SOUND SETTINGS START TIME=2251 END TIME=2255</EVENT>
<EVENT NAME=SOUND SETTINGS START TIME=2360 END TIME=2364</EVENT> </META EVENT>
<META EVENT=BROWSE> <EVENT NAME=UP START TIME=2674 END TIME=2675</EVENT>
<EVENT NAME=LEFT START TIME=2694 END TIME=2699</EVENT>
<EVENT NAME=RIGHT START TIME=2834 END TIME=2838</EVENT>
<EVENT NAME=DOWN START TIME=2856 END TIME=2858</EVENT>
<EVENT NAME=LEFT START TIME=2881 END TIME=2882</EVENT> </META EVENT>
<META EVENT=CHANNEL SELECTION> <EVENT NAME=SWAP START TIME=2911 END TIME=2914</EVENT>
<EVENT NAME=SWAP START TIME=2931 END TIME=2936</EVENT>
<EVENT NAME=PIP START TIME=2958 END TIME=2962</EVENT> </META EVENT>
<META EVENT=APPLICATION LOAD>
<EVENT NAME=SOUND SETTINGS START TIME=3524 END TIME=3528</EVENT> </META EVENT>
<META EVENT=INFORMATION> <EVENT NAME=LANGUAGE START TIME=3714 END TIME=3717</EVENT>
</META EVENT>
<META EVENT=APPLICATION LOAD> <EVENT NAME=SOUND SETTINGS START TIME=3015 END TIME=3018</EVENT>
<EVENT NAME=SOUND SETTINGS START TIME=3070 END TIME=3074</EVENT> </META EVENT>
<SUBSESSION>
<SESSION=POWER OF>
```

FIG. 4A: AN ILLUSTRATIVE DATA SET – SESSION 2

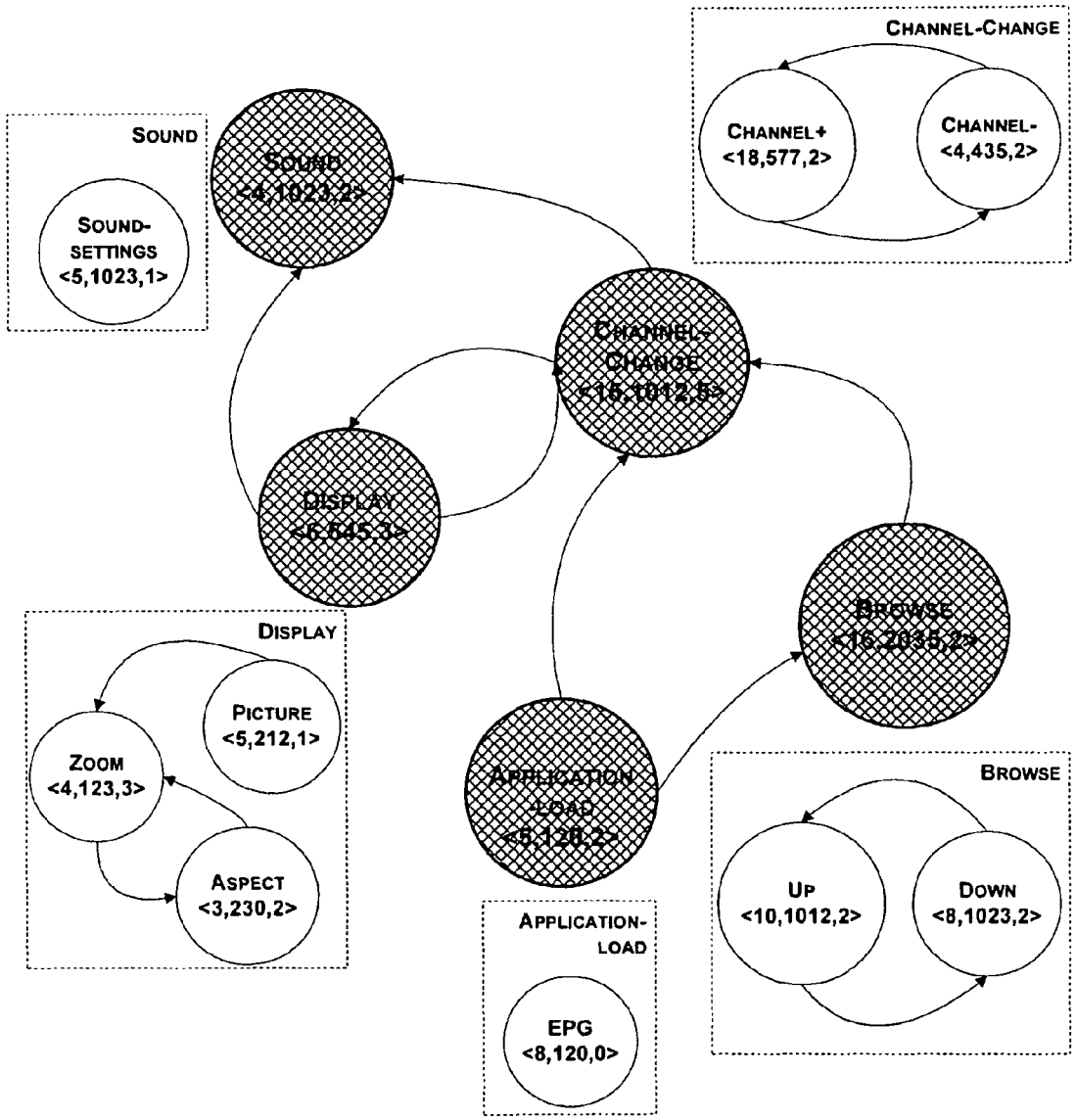
FIG. 5: AN ILLUSTRATIVE NAMED MODEL – PRE-DEFINED MODEL 1 (RESTLESSNESS)

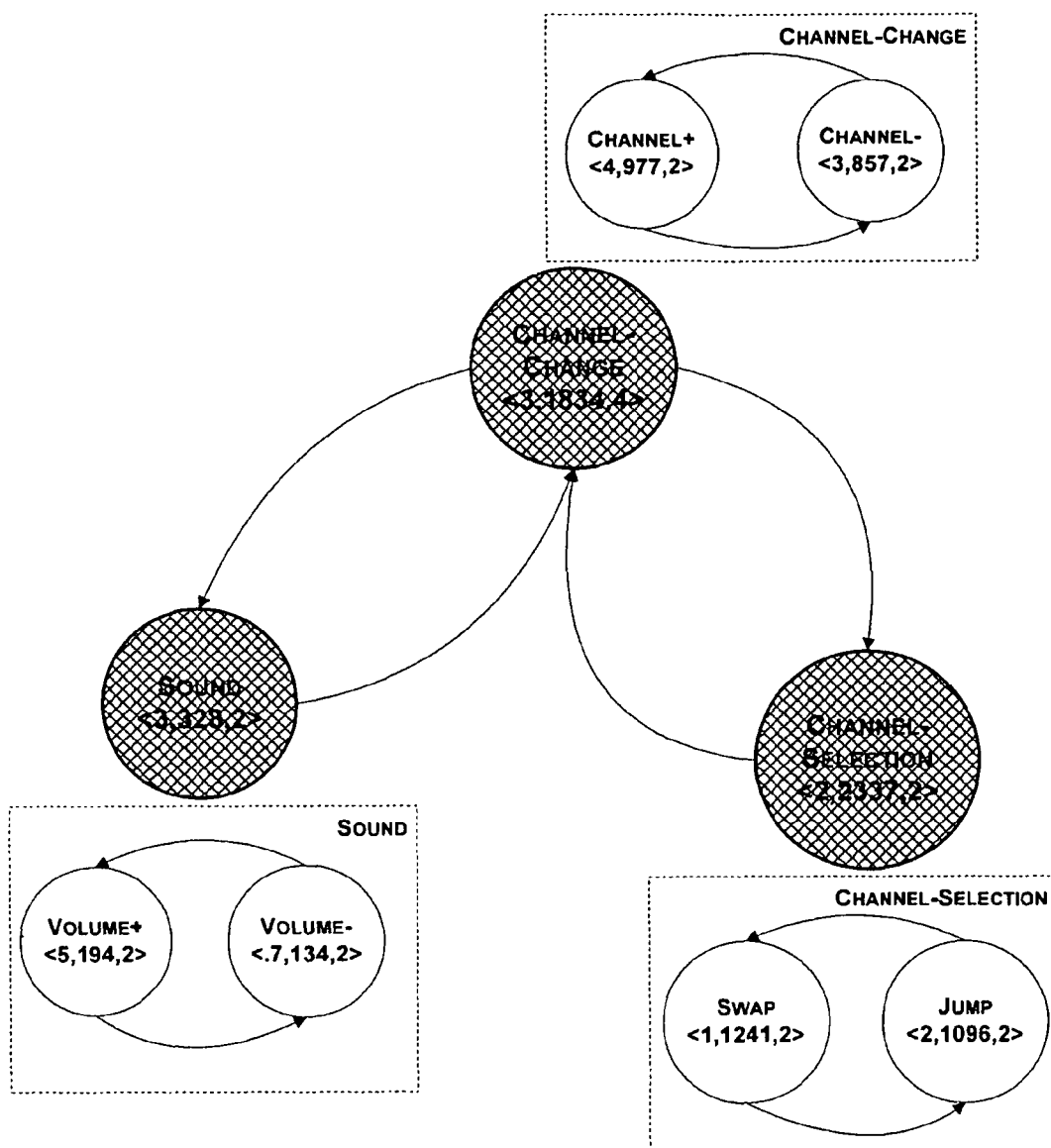
FIG. 5A: AN ILLUSTRATIVE NAMED MODEL – PRE-DEFINED MODEL 2 (FOCUSED WATCH)

```
ALGORITHM SESSION STATE MACHINE BUILDING

OBJECTIVE:
    TO ANALYZE A SESSION DATA TO GENERATE A SESSION-SPECIFIC STATE MACHINE

INPUT:
    SESSIONDATA: A SEQUENCE OF EVENTS = (E1, E2, ..., Ex)
    META-EVENT DATABASE COMPRISING BASIC EVENT TO META-EVENT MAPPING;

OUTPUT:
    SESSIONSTATEMACHINE: L1RSM;

{
    FOR EACH EVENT EI IN SESSIONDATA
        OBTAIN THE CORRESPONDING META-EVENT (ME);
        LOCATE THE NODE N1 IN L1RSM CORRESPONDING TO ME;
        IF THERE IS NO SUCH NODE, CREATE A NEW NODE N1 IN L1RSM;
        OBTAIN THE L2RSM CORRESPONDING TO N1;
        LOCATE THE NODE N2 IN L2RSM CORRESPONDING TO EI;
        IF THERE IS NO SUCH NODE, CREATE A NEW NODE N2 IN L2RSM;
        UPDATE L2RSM WITH ATTRIBUTES OF EI;
        UPDATE THE NODE N2 VALUES FOR <N, T, E>;
        UPDATE THE NODE N1 VALUES FOR <N, T, E>;
// ANALYZE THE CREATED RSM, TO REMOVE NOISY EVENTS SUCH AS THOSE KEY PRESSES THAT
// ARE PERFORMED BY MISTAKE
    FOR EACH NODE N1 IN L1RSM
        OBTAIN THE L2RSM CORRESPONDING TO N1;
        ANALYZE L2RSM AND COMPUTE THE TYPICAL <N', T', E'>;
            THE TYPICAL VALUE COMPUTATION TAKES INTO ACCOUNT THE FACTORS SUCH AS THE
            VALUE OF <N, T, E> ACROSS THE NODES OF THE RSM, THE META-EVENT UNDER
            CONSIDERATION, AND THE BASIC EVENT UNDER CONSIDERATION.
        FOR EACH NODE N2 IN L2RSM
            OBTAIN <N, T, E>
            IF <N, T, E> IS NOT CLOSE TO <N', T', E'>,
                RECORD THE DEVIATION AND MARK N2 FOR DELETION
        ARRANGE THE NODES MARKED FOR DELETION IN L2RSM IN THE DESCENDING ORDER OF
            THEIR DEVIATIONS;
        SELECT A PRE-DEFINED NUMBER OF NODES AND DELETE THEM FROM L2RSM;
}
```

FIG. 6: APPROACH FOR SESSION MODELING

ALGORITHM SESSION MATCHING

OBJECTIVE:
    TO MATCH A SESSION STATE MACHINE AGAINST A SET OF PRE-DEFINED MODELS

INPUT:
    SESSIONSTATEMACHINE: L1RSM;
    SBM = {BM1, BM2, ..., BMx} IS A SET OF LABELED PRE-DEFINED BEHAVIORAL MODELS;

OUTPUT:
    SESSIONMODELS: A SUBSET OF SBM SUCH THAT EACH ELEMENT OF THE SUBSET CLOSELY MATCHES WITH L1RSM

{
    FOR EACH BMI IN SBM
        PERFORM STRUCTURAL MATCHING TO OBTAIN $S_I$;
        PERFORM TEMPORAL MATCHING TO OBTAIN $T_I$;
        COMPUTE $D_I$ AS $W_1 * S_I + W_2 * T_I$; $D_I$ IS THE OVERALL MATCHING ERROR ASSOCIATED WITH BMI;
    ORDER BMI'S BASED ON $D_I$'S;
    SELECT A PRE-DEFINED NUMBER OF MODELS BMM 'S WITH BEST $D_M$'S THAT IS WITHIN A PRE-DEFINED THRESHOLD AS SESSIONMODELS;
}

STRUCTURAL MATCHING
{
    FOR EACH NODE N1 IN BMI
        FIND THE CORRESPONDING NODE N2 IN L1RSM;
        OBTAIN <N, T, E> ASSOCIATED WITH N1;
        OBTAIN <N', T', E'> ASSOCIATED WITH N2;
        FIND DISTANCE X1 BETWEEN N1 AND N2 BASED ON <N, T, E> AND <N', T', E'>;
        LET L2R(N1) BE THE L2RSM ASSOCIATED WITH N1;
        LET L2R(N2) BE THE L2RSM ASSOCIATED WITH N2;
//FIND THE STRUCTURE BASED DISTANCE Y1 BETWEEN L2R(N1) AND L2R(N2) BY ITERATING
//OVER THE STRUCTURE
        FOR EACH NODE N11 IN L2R(N1)
            FIND THE CORRESPONDING NODE N12 IN L2R(N2)
            OBTAIN <N, T, E> ASSOCIATED WITH N11;
            OBTAIN <N', T', E'> ASSOCIATED WITH N12;
            FIND DISTANCE Y1 BETWEEN N11 AND N12 BASED ON <N, T, E> AND <N', T', E'>;
            ADD Y1 TO Y;
        ADD X1, Y TO $S_I$; $S_I$ IS THE OVERALL STRUCTURAL MATCHING ERROR ASSOCIATED WITH BMI
}

FIG. 7: APPROACH FOR SESSION MATCHING (STRUCTURAL)

ALGORITHM SESSION MATCHING (CONTD.)

INPUT: A PRE-DEFINED MODEL BMI; A SESSION STATE MACHINE L1RSM;
OUTPUT: A MEASURE TI BASED ON TEMPORAL MATCHING;

TEMPORAL MATCHING
{
   LET BMISEQ BE A TEMPORAL SEQUENCE ASSOCIATED WITH BMI WITHOUT CONSIDERING THE
      L2RSMS ASSOCIATED WITH THE NODES OF BMI;
   LET L1SEQ BE A TEMPORAL SEQUENCE ASSOCIATED WITH L1RSM WITHOUT CONSIDERING
      THE ASSOCIATED L2RSMS WITH THE NODES OF L1RSM;
   APPLY A WARPING TECHNIQUE BASED ON, SAY, DYNAMIC PROGRAMMING, TO DETERMINE
      MINIMUM MATCHING ERROR; USE A DISTANCE MEASURE BASED ON <N, T, E> ASSOCIATED
      WITH THE NODES OF BMISEQ AND L1SEQ, AND DISTANCE BETWEEN A PAIR OF META-
      EVENTS BASED ON A DISTANCE METRIC;
   LET TE1 BE THE MINIMUM MATCH ERROR;

FOR EACH NODE N1 IN BMI
      FIND THE CORRESPONDING NODE N2 IN L1RSM;
      LET L2R(N1) BE THE L2RSM ASSOCIATED WITH N1;
      LET L2R(N2) BE THE L2RSM ASSOCIATED WITH N2;
      LET L2R(N1)SEQ BE A TEMPORAL SEQUENCE ASSOCIATED WITH L2R(N1);
      LET L2R(N2)SEQ BE A TEMPORAL SEQUENCE ASSOCIATED WITH L2R(N2);
      APPLY A WARPING TECHNIQUE BASED ON, SAY, DYNAMIC PROGRAMMING, TO DETERMINE
         MINIMUM MATCHING ERROR; USE A DISTANCE MEASURE BASED ON <N, T, E>
         ASSOCIATED WITH THE NODES OF L2R(N1)SEQ AND L2R(N2)SEQ, AND DISTANCE
         BETWEEN A PAIR OF BASIC EVENTS BASED ON A DISTANCE METRIC;
      LET E2 BE THE MINIMUM MATCH ERROR;
      ADD E2 TO TE2;

TI = TE1 + TE2; TI IS THE OVERALL TEMPORAL MATCHING ERROR ASSOCIATED WITH BMI;
}

FIG. 7A: APPROACH FOR SESSION MATCHING (TEMPORAL)

```
ALGORITHM SESSION MERGING

INPUT: A PLURALITY OF SESSION MODELS SL1RSM = {L11, L12, ..., L1X}
OUTPUT: AN ABSTRACT MODEL, L1M

{
// LEVEL 1 STRUCTURAL MERGING
   FOR EACH NODE NI IN L11,
      OBTAIN <N1, T1, E1> ASSOCIATED WITH NI;
      OBTAIN A PLURALITY OF <NI, TI, EI>'S ASSOCIATED WITH THE NODE CORRESPONDING TO NI
         IN SESSION MODELS L12, ..., L1X;
      COMPUTE <NI', TI', EI'> AS THE CENTROID OF <NI, TI, EI> WITH 1 <= I <= X AND
         ASSOCIATE THE SAME WITH NI OF L1M;
// LEVEL 1 TIME DISTRIBUTION
   FOR EACH NODE NI IN L1M,
      OBTAIN <NI, TI, EI> ASSOCIATED WITH NI;
      OBTAIN THE SEQUENCE <<TS11, TE11> ... <TS1Y, TE1Y>> ASSOCIATED WITH THE NODE
         N1' OF L11, WHEREIN N1' CORRESPONDS WITH NI;
      OBTAIN THE SEQUENCES ASSOCIATED WITH THE NODE CORRESPONDING TO NI IN SESSION
         MODELS L12, ..., L1X;
      BASED ON THE ABOVE SEQUENCES, DETERMINE A SEQUENCE THAT HAS LEAST MATCH
         ERROR AND IS CLOSELY CONSISTENT WITH <NI, TI, EI> ASSOCIATED WITH NI;
         THIS RESULTS IN TIME SEQUENCE INDICATING THE VISITS TO NI;
      ASSOCIATE THIS TIME SEQUENCE WITH NI OF L1M;
// ADJUSTING FOR INCONSISTENCY
   COMPUTE AN INCONSISTENCY MEASURE BASED ON THE PLURALITY OF <N, T, E>'S
      ASSOCIATED WITH THE NODES OF L1M; NOTE THAT THE INCONSISTENCY MEASURE
      ACCOUNTS FOR BOTH STRUCTURAL INCONSISTENCY AND TEMPORAL INCONSISTENCY
      ASSOCIATED WITH L1M;
   ADJUST MINIMALLY THE PLURALITY OF <N, T, E>'S ASSOCIATED WITH THE NODES OF L1M TO
      ACCOUNT FOR THE INCONSISTENCY MEASURE;
// CONSTRAINT BASED LEVEL 2 MERGING
   FOR EACH NODE NI IN L1M,
      OBTAIN SL2RSM CONTAINING A PLURALITY OF L2RSM'S ASSOCIATED WITH THE NODE
         CORRESPONDING TO NI IN SESSION MODELS L11, L12, ..., L1X;
      OBTAIN THE SEQUENCE TS = <<TSI1, TEI1>, ..., <TSIY, TEIY>> ASSOCIATED WITH NI;
      FOR EACH L2RSM IN SL2RSM,
         BIND L2RSM TO BE WITHIN TS BY DROPPING EVENTS THAT ARE OUTSIDE THE BOUND
            AND MODIFYING EVENTS IF NECESSARY;
      CLUSTER L2RSM'S IN SL2RSM BASED ON STRUCTURAL AND TEMPORAL SIMILARITY;
      ORDER CLUSTERS ON THEIR SIZE;
      SELECT A PRE-DEFINED NUMBER OF CLUSTERS FROM THE TOP OF THE ORDERED CLUSTERS;
      TRANSFORM THE ABSOLUTE TIMESTAMPS ASSOCIATED WITH THE EVENTS TO RELATIVE
         TIMESTAMPS;
      BIND THE SELECTED CLUSTERS WITH RELATIVE TIMESTAMPS TO NI;
}
```

FIG. 8: APPROACH FOR SESSION MERGING

```
ALGORITHM MODEL BUILDING

INPUT: A PLURALITY OF SESSION-SPECIFIC STATE MACHINES, SL1 = {L11, L12, ..., L1x};
SBM = {BM1, BM2, ..., BMx} IS A SET OF LABELED PRE-DEFINED BEHAVIORAL MODELS;

OUTPUT: A PLURALITY OF ABSTRACT MODELS, SL1M

{
   FOR EACH L1I IN SL1,
      DETERMINE WHETHER L1I IS CLOSE TO ANY MODEL IN SBM;
      IF NOT, MAKE L1I PART OF TL1;

FOR EACH L1I IN TL1,
      MAKE L1I PART OF T1L1;
      FOR EACH L1J IN TL1,
         IF L1J IS SIMILAR TO L1I, MAKE L1J PART OF T1L1;
      SESSION MERGE BASED ON T1L1 TO GENERATE AN ABSTRACT MODEL L1M;
      MAKE L1M PART OF SL1M;
}
```

FIG. 9: APPROACH FOR MODEL BUILDING

| SESSION DATA | MODEL 1 (RESTLESSNESS) | MODEL 2 (FOCUSED WATCH) |
|---|---|---|
| SESSION 1A | 0.73 | 0.35 |
| SESSION 1B | 0.21 | 0.83 |
| SESSION 2A | 0.19 | 0.54 |
| SESSION 2B | 0.22 | 0.39 |

FIG. 10: ILLUSTRATIVE RESULTS

| SESS-ION ID | SESSION DATA<br>FORMAT: [EVENT NAME, START TIME] |
|---|---|
| 1 | [POWERON,0][JUMP,10][SWAP,53][VOLUME+,523][PICTURESETTINGS,830][SWAP,953] [POWEROFF,1022] |
| 2 | [POWERON,0] [SOUND,10] [RECORD,130] [STOP,172] [PAUSE, 211] [RECORD,226][SOUND, 319] [RECORD, 351] [POWEROFF,,385] |
| 3 | [POWERON,0][JUMP,22][JUMP,54][JUMP,112][VOLUME+,952][VOLUME+,962][POWEROFF,982] |
| 4 | [POWERON,0] [PAUSE,77] [PLAY,200] [SWAP,212] [SOUNDSETTINGS,588] [PICTURESETTINGS,679] [VOLUME+,715] [ASPECTRATIO,730] [RECORD,849] [POWEROFF,981] |
| 5 | [POWERON,0][JUMP,25][VOLUME+,329][VOLUME+,353][JUMP 362][PICTURESETTINGS,758][POWEROFF,834] |
| 6 | [POWERON,0] [CHANNEL+,22] [CHANNEL+,39] [SOUNDSETTINGS,62] [MENU,101] [PICTURE SETTINGS,138] [CHANNEL-,169] [CHANNEL+,207] [A/VSOURCE,221] [EPG,237] [UP,251] [EPG,283] [DOWN,324] [CHANNEL+,378] [CHANNEL+,607] [CHANNEL+,638] [POWEROFF,761] |
| 7 | [POWERON,0] [VOLUME+,31] [VOLUME-,55] [PAUSE,86] [PLAY,216] [ASPECTRATIO,254] [ZOOM,278] [ZOOM,292] [RECORD,333] [PAUSE,354] [PLAY,392] [POWEROFF,436] |
| 8 | [POWERON,0] [CHANNEL+,12] [CHANNEL+,30] [A/VSOURCE,60] [SOUNDSETTINGS,93] [MENU,118] [EPG,151] [SOUNDSETTINGS,163] [PICTURESETTINGS,179] [EPG,297] [UP,326] [UP,345] [CHANNEL-,467] [POWEROFF,890] |
| 9 | [POWERON,0] [CHANNEL+,15] [CHANNEL+,129] [CHANNEL+,169] [CHANNEL+,230] [EPG,272] [DOWN,346] [DOWN,410] [PICTURESETTINGS,426] [CHANNEL+,495] [POWEROFF,954] |
| 10 | [POWERON,0] [SWAP,12] [VOLUME+,36] [PICTURESETTINGS,91] [ASPECTRATIO,255] [PAUSE,277] [PLAY,363] [SOUNDSETTINGS,376] [RECORD,419] [MUTE,469] [POWEROFF,592] |
| 11 | [POWERON,0][SWAP,15][SWAP,55][VOLUME+,315][VOLUME-,343][JUMP,433][POWEROFF,734] |
| 12 | [POWERON,0] [CHANNEL+,55] [CHANNEL+,139] [PICTURESETTINGS,155] [CHANNEL+,213] [CHANNEL+,267] [EPG,325] [DOWN,335] [UP,406] [DOWN,457] [UP,478] [UP,510] [PICTURESETTINGS,526] [CHANNEL+,595] [POWEROFF,1054] |
| 13 | [POWERON,0] [RECORD,120] [STOP,130] [RECORD,160] [PAUSE,179] [RECORD,194] [STOP,222] [FORWARD,258] [POWEROFF,292] |
| 14 | [POWERON,0][JUMP,34][JUMP,634][PICTURESETTINGS,803][POWEROFF,921] |
| 15 | [POWERON,0][JUMP,18][SWAP,31][VOLUME+,311][VOLUME,328][JUMP,380][SWAP,944][POWEROFF,1232] |
| 16 | [POWERON,0] [CHANNEL+,34] [CHANNEL+,118] [PICTURESETTINGS,119] [EPG,177] [DOWN,187] [UP,198] [UP,209] [UP,230] [UP,253] [CHANNEL+,307] [PICTURESETTINGS,323] [CHANNEL+,392] [POWEROFF,626] |
| 17 | [POWERON,0][JUMP,84][PICTURESETTINGS,439][VOLUME+,912][JUMP,950][POWEROFF,983] |
| 18 | [POWERON,0] [RECORD,120] [STOP,142] [RECORD,184] [PAUSE,203] [RECORD,218] [POWEROFF,262] |
| 19 | [POWERON,0] [VOLUME+,31] [ASPECTRATIO,285] [PAUSE,371] [PLAY,487] [ASPECTRATIO,541] [ZOOM,819] [ZOOM,821] [RECORD,944] [PAUSE,998] [POWEROFF,1032] |
| 20 | [POWERON,0][VOLUME+,10][JUMP,55][VOLUME+,437][JUMP,442][PICTURESETTINGS,789][POWEROFF,834] |

FIG. 10A: ILLUSTRATIVE SESSION DATA FOR MODEL DISCOVERY

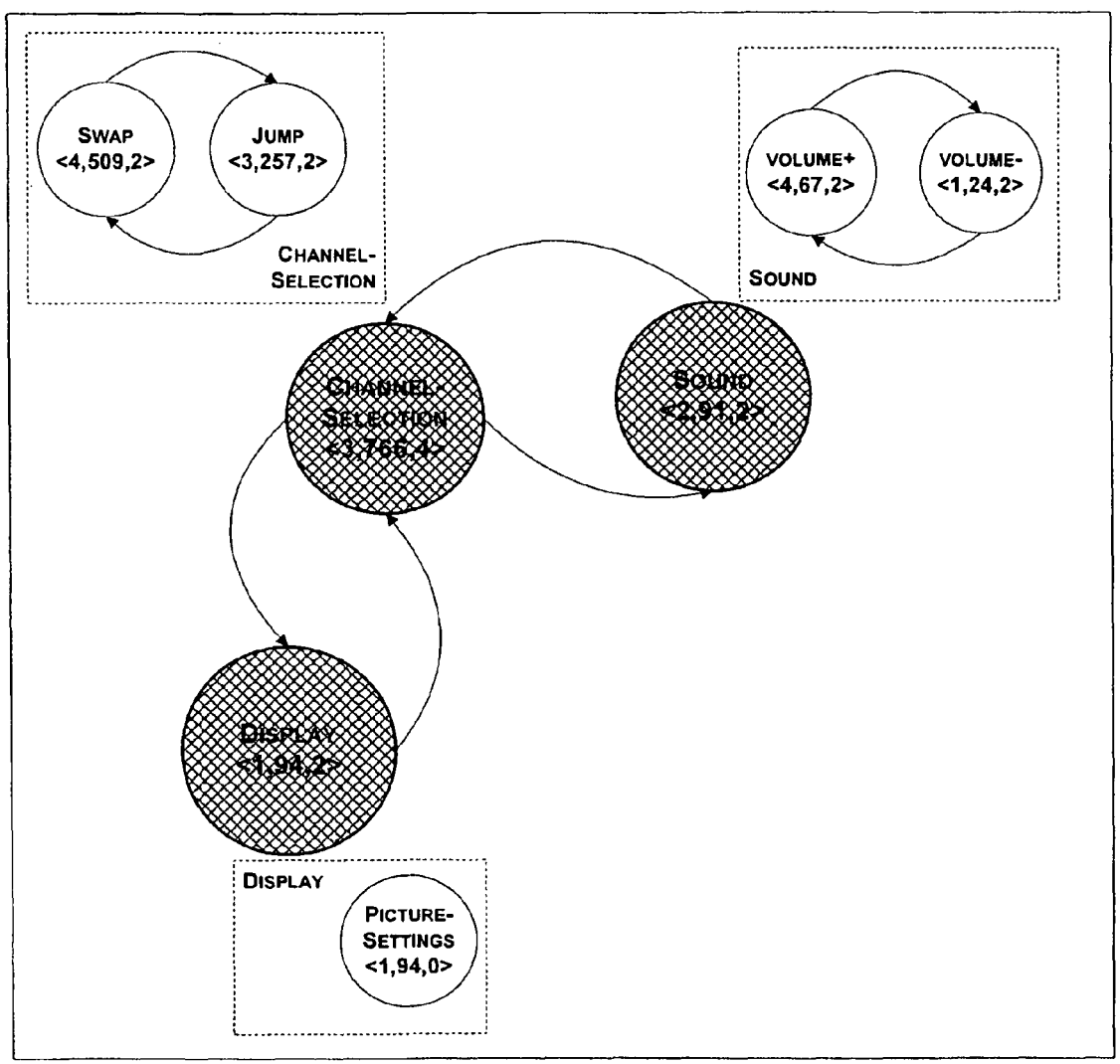
| CLUSTER ID | SESSION ID |
|---|---|
| 1 | 1, 3 ,5, 11, 14, 15, 17, 20 |
| 2 | 4, 7, 10, 19 |
| 3 | 6, 8, 9, 12, 16 |
| 4 | 2, 13, 18 |
FIG. 10B: ILLUSTRATIVE CLUSTERS FOR MODEL DISCOVERY
FIG. 10C: AN ILLUSTRATIVE MODEL DISCOVERY – BASED ON CLUSTER ID 1

SYSTEM AND METHOD FOR REMOTE USAGE MODELING

FIELD OF THE INVENTION

The present invention relates to usage analysis in general and more particularly, the analysis of remote control unit usage. Still more particularly, the present invention is related to a system and method for the analysis of usage of a remote control unit for operating and controlling of a device.

BACKGROUND OF THE INVENTION

The usage of remote control units to operate and control devices is very common. And, this is more so with home appliances. A typical home has multiple appliances such as refrigerators, air conditioners, televisions, and personal video recorders and players. Further, each appliance has a specialized remote control unit to help operate and control the related appliance. Let us consider a television remote control unit. A typical such remote provides the functional support such as for the following: browse (to browse through the channels), swap (to swap a channel with the last viewed channel), increase volume, decrease volume, jump to a particular channel, power on, power off, and set timer. The analysis of the way a remote is used to operate and control a television provides an insight into the user behavior. This insight helps greatly in general in content personalization, and in particular in content targeting, say for example, ad targeting. The requirement is to study carefully the remote usage data so as to determine the specific usage patterns hidden in the data. There are two kinds of usage patterns: (i) one that falls into a generic category of patterns; these are the patterns typically determined in a top down manner based on the expected user behavior when under particular mental state and expanded based on observed data; (ii) the other that falls into a specific (user-specific) category of patterns; these patterns are typically determined completely based on the observed data (without possibly a recourse to mental states). These models depict the abstracted behavior of users leading to an effective content (and in particular, ads) targeting. Note that the usage of the term "user" is in generic sense: for example, in a home context, "user" refers collectively to everybody in a home who operates a remote. The present invention addresses the issues of exploiting top-down (generic) models and discovering bottom-up (specific) models so as to effectively characterize a remote control unit usage.

DESCRIPTION OF RELATED ART

U.S. Pat. No. 7,260,823 to Schlack; John A. (Southampton, Pa.), Sutton; Andrew (Norristown, Pa.), Rampulla; Andrew J (Quakertown, Pa.), Eldering; Charles A (Doylestown, Pa.) for "Profiling and identification of television viewers" (issued on Aug. 21, 2007 and assigned to Prime Research Alliance E., Inc. (Tortola, VG)) describes an approach for profiling a television viewer by monitoring and processing, locally at a television viewing environment, the viewer's interactivity (for example, via a remote control unit) with the television viewing environment.

U.S. Pat. No. 7,092,926 to Cerrato; Dean E. (Boston, Mass.) for "Method and apparatus for identifying unique client users from user behavioral data" (issued on Aug. 15, 2006 and assigned to Sedna Patent Services, LLC (Philadelphia, Pa.)) describes an approach for identifying a current user of a terminal device from a group of possible users based on a database containing multiple user input pattern profiles of prior user inputs to the terminal device.

U.S. Pat. No. 6,286,140 to Ivanyi; Thomas P. (New York, N.Y.) for "System and method for measuring and storing information pertaining to television viewer or user behavior" (issued on Sep. 4, 2001) describes a system for monitoring television viewer behavior by generating of events such as "a channel change," and "a volume change" and storing of these timed events.

"Modeling User Behaviour by Planning" by Milani, A. and Silvia S. (appeared in Proceedings of World Academy of Science, Engineering and Technology, Volume 28, April 2008) describes the user behavior recognition as a planning problem and introduces a technique for transforming a timed finite state automata description of the behavior into a numerical parameter planning model.

"A Target Advertisement System based on TV Viewer's Profile Reasoning" by Lim, J., Kim, M., Lee, B., Kim, M., Lee, H., and Lee, H. (appeared in Multimedia Tools and Applications Journal, Volume 36, Numbers 1-2/January, 2008, Springer Netherlands) describes a user profile reasoning method for TV viewers based on genre preferences and TV viewing times for TV viewer's groups in different genders and ages.

"SSM: A Frequent Sequential Data Stream Patterns Miner" by Ezeife, C. I. and Monwar, M. (appeared in Proceedings of the EEE Symposium on Computational Intelligence and Data Mining, 2007 (CIDM 2007), Honolulu, Hi., USA, 1-5 Apr. 2007) describes the process of discovering frequent sequential patterns in data sequences as found in applications like web log access sequences.

The known systems do not address the various issues related to the modeling of a remote control unit usage in order to be able to map the same onto a user behavior without using any support data such as Electronic Program Guide and Content related information (in the case of a television). The present invention provides a system and method for addressing these issues in order to effectively exploit a plurality of pre-defined models as well as discovering user-specific models.

SUMMARY OF THE INVENTION

The primary objective of the invention is to analyze a remote control unit usage data related to a user in order to assess a plurality of behaviors exhibited by the user.

One aspect of the invention is to analyze the remote control unit usage related to a particular operating (say, a TV viewing) session to determine session-specific state machine.

Another aspect of the invention is to describe a remote control unit usage based on a plurality of basic events and a plurality of meta events, wherein each meta event is an abstraction of a plurality of basic events.

Yet another aspect of the invention is to describe a remote control unit usage data based on a two-level state machine, wherein the first level state machine is based on meta events, and the second level state machine is based on basic events with each node of the first level state machine being associated with a second level state machine.

Another aspect of the invention is to match a session-specific state machine against a plurality of pre-defined abstracted remote control unit usage models.

Yet another aspect of the invention is to define a matching of a session-specific state machine with respect to a pre-defined model based on two properties of the model, namely, structural properties and temporal properties.

Another aspect of the invention is to merge a plurality of session-specific state machines.

Yet another aspect of the invention is to discover a plurality of user-specific remote control unit usage models based on remote control unit usage data related to a plurality remote operating sessions.

BRIEF DESCRIPTION OF THE DRAWINGS

FIG. 1 depicts an illustrative TV/STB scenario.

FIG. 2 depicts an illustrative Remote Usage Modeling System.

FIG. 3 depicts illustrative basic events and meta-events.

FIG. 3a depicts an illustrative characterization of a session.

FIG. 3b depicts illustrative representation of a session and a remote state machine.

FIG. 4 depicts an illustrative data set.

FIG. 4a depicts another illustrative data set.

FIG. 5 depicts an illustrative named pre-defined model.

FIG. 5a depicts another illustrative named pre-defined model.

FIG. 6 provides an approach for session modeling.

FIG. 7 provides an approach for session matching based on structural properties.

FIG. 7a provides an approach for session matching based on temporal properties.

FIG. 8 provides an approach for session merging.

FIG. 9 provides an approach for building a user-specific model.

FIG. 10 depicts illustrative results.

FIG. 10a depicts illustrative session data for model discovery.

FIG. 10b depicts illustrative clusters for model discovery.

FIG. 10c depicts an illustrative model discovery.

DETAILED DESCRIPTION OF THE PREFERRED EMBODIMENTS

Remote control units are very popular handheld units that are used to control the operations of a variety of devices. Specifically, such units are used extensively with home appliances such as air conditioners and televisions. In particular, remote control units for televisions have addressed the functional requirements extremely well as so much of variety exists in channels being delivered, and at the same time televisions have also rich functional controls. This means that a user viewing a TV uses the remote control unit somewhat more frequently and there is an opportunity to analyze such a remote control unit usage data to characterize and subsequently predict the behavior. There are a variety of applications of the user behavior characterization: for example, if a user behavior is predicted to be one of "restlessness," it may be appropriate to target ads that take into account this expected behavior. Another use of the analysis of a remote control unit usage data is to better design and dynamically adapt the remote control unit to provide improved interactions.

Remote control unit usage data is characterized based on a set of events associated with the remote control unit interactions. In order to better model the usage data, the following are proposed: (a) define and use meta-events in modeling: a meta-event is an abstract event standing for a set of basic events; and (b) define and use the notion of two-level state machine, called as remote state machine (RSM): an RSM is a state machine in which the first level state machine is based on meta-events and each node in this first level stands for a meta-event; and the second level state machine is based on basic events and a second level state machine is associated with each node of the first level state machine. The analysis of remote control unit usage data leads to the defining of an RSM based on the usage data. Similarly, both the pre-defined models and discovered models are also RSMs. Note that session model, session-specific state machine, and remote state machine (RSM) are used interchangeably. Also, an event and basic event are also used interchangeably. Further, sometimes, remote control unit is referred just as remote.

FIG. 1 depicts an illustrative TV/STB scenario. In this scenario, a remote control unit (100) is used to interact with a set-top box (STB) (110) to control the functionality of a television (120). A typical STB supports various functionalities that include the receiving and displaying of the selected channel contents. One of the important functionalities is to support RUM (Remote Usage Modeling) subsystem (130) that makes use of a database (140) to help build a session-specific state machine and determine an appropriate model that matches best with the session-specific state machine. In particular, RUM subsystem takes a session usage data as input to achieve model based annotation of the session. This annotation is used by another subsystem (150) to help select appropriate ads based on an STB database (160).

FIG. 2 depicts an illustrative Remote Usage Modeling System. The RUM System (200) comprises of a variety of modules to help capture, analyze, and label a session. The database (210) consists of Session database to provide session information, Pre-defined models, and Discovered models. The main modules of RUM are: Session Capture (220) that obtains session-specific usage data from a database; Session Analysis (230) analyzes the captured session-specific usage data and prepares for further processing; Session State Machine Building (240) determines the basic events and meta-events that are part of the usage data, constructs an RSM based on the data, and processes the constructed RSM to eliminate noisy and erroneous remote interactions; Session Matching (250) matches the constructed RSM against a set of pre-defined models to determine if any of the pre-defined models can be used to model the session-specific remote usage data; Session Merging (260) module helps in merging two or more session-specific remote usage data to arrive at a combined model; and finally, Modeling Building (270) analyzes a set of session-specific remote usage data to discover one or more user-specific models that better describe the usage data as compared with the set of pre-defined models.

FIG. 3 depicts illustrative basic events and meta-events. An illustrative set of basic events (300) includes events such as Channel+ and Volume–. In order to be able to process the session-specific usage data in a more effective manner, a related set of basic events are grouped to form a meta-event. Some illustrative meta-events (310) include Sound and Channel-Change. The annotations of a session-specific usage data is based on the labels associated with the pre-defined models and discovered models. These labels suggest about the possible psychological states of mind while viewing TV. Some of the illustrative psychological states (320) include "Leisurely Watching" and "Focused Watching."

FIG. 3a depicts an illustrative characterization of a session. On power-on (1), there is a frequent usage of a remote control unit (2) leading to a settling down on a channel (3). After a while, there is again a frequent usage of the remote control (4) leading to a short stable period (5) before power-off (6).

FIG. 3b depicts illustrative representation of a session and a remote state machine. Information related to a Session is as follows:
(i) Consider a remote control unit usage behavior depicted in FIG. 3a.
(ii) The figure depicts activities performed using the remote between power-on (indicated by circled 1) and power-off (indicated by circled 6);
(iii) There is a brief period of hyper-activity of remote usage (circled 2) before a significant period of remote inactivity (circled 3);
(iv) This follows another period of hyper-activity (circled 4), and a brief period of inactivity (circled 5) before power-off;
(v) Given this, a session is defined as a period of remote activity followed by a period of remote inactivity;
(vi) Examples: Circled 1, 2, and 3 form a session and circled 4, 5, and 6 form another session;
(vii) Some times, it is useful to have a lower bound on the duration: Time period of circled 3 to be greater than a pre-defined threshold;
(viii) Each basic event has a time-stamp, label, and one or more attributes;
(ix) Session data is a sequence of basic events wherein each basic event is a remote key press down to press up;
A basic event is represented as
    <EventID, StartTime, EndTime, InitialAttributes, FinalAttributes>
    Note that the attribute values are optional;
Session State Machine:
(i) This is based on remote state machine (RSM): an RSM is a multi-level graph wherein there is a labeled and weighted graph at each level (hierarchical state machines);
(ii) In a typical representation, there are two levels:
(iiA) Level 1 (L1) RSM is based on meta-events with each node in L1 representing a meta-event;
(iiB) Level 2 (L2) RSM is based on basic events in which each node stands for a basic event;
(iiC) Each L2 RSM is associated with a node of an L1 RSM and hence, basic events of an L2 RSM are bound by a meta-event;
(iiD) Each node in an RSM has three attributes <N, T, E>:
N—stands for number visits to the node during a session; T—stands for an aggregated time of visits; and E—stands for the number of edges at N;
FIG. 4 depicts an illustrative data set. Note that, for illustrative purposes, subsession and meta-event information are also depicted in the figure.
Similarly, FIG. 4a depicts another illustrative data set.
FIG. 5 depicts an illustrative named model. Observe that the model depicts five meta-events, namely, Sound, Display, Channel-Change, Browse, and Application-Load. The state machine based on these five meta-events forms a level 1 state machine. Each node in the level 1 state machine has an associate level 2 state machine. For example, associated with Display meta-event, the figure depicts a state machine based on the following basic events: Picture, Zoom, and Aspect. Observe further that, each node (in both level 1 state machine and level 2 state machine) has three attributes based on <N, T, E>. Named models are typically part of a pre-defined database of models.
Similarly, FIG. 5a depicts another illustrative named model.
FIG. 6 provides an approach for session modeling. This involves analyzing of session-specific remote control unit usage data to build an RSM.
The main objective is to analyze a session data to generate a session-specific state machine.

The inputs include the following;
    SessionData: A sequence of Events=(E1, E2, . . . , Ex)
    Meta-Event Database comprising basic event to meta-event mapping;
The output is a SessionStateMachine: L1RSM;
For each event Ei in SessionData
Step 1: Obtain the corresponding meta-event (Me);
Step 2: Locate the node N1 in L1RSM corresponding to Me;
Step 3: If there is no such node, Create a new node N1 in L1RSM;
Step 4: Obtain the L2RSM corresponding to N1;
Step 5: Locate the node N2 in L2RSM corresponding to Ei;
Step 6: If there is no such node, Create a new node N2 in L2RSM;
Step 7: Update L2RSM with attributes of Ei;
Step 8: Update the node N2 values for <N, T, E>;
Step 9: Update the node N1 values for <N. T, E>;
// Analyze the created RSM, to remove noisy events such as those key presses that // are performed by mistake
For each node N1 in L1 RSM
Step 1: Obtain the L2RSM corresponding to N1;
Step 2: Analyze L2RSM and compute the typical <N', T', E'>;
The typical value computation takes into account the factors such as the value of <N, T, E> across the nodes of the RSM, the meta-event under consideration, and the basic event under consideration;
Step 3: For each node N2 in L2RSM
Step 3a: Obtain <N, T, E>
Step 3b: If <N, T, E> is not close to <N', T', E'>,
    Record the deviation and mark N2 for deletion;
Step 3c: Arrange the nodes marked for deletion in L2RSM in the descending order of their deviations;
Step 3d: Select a pre-defined number of nodes and delete them from L2RSM;
FIG. 7 provides an approach for session matching based on structural properties.
The objective is to match a session state machine against a set of pre-defined models;
The input includes the following:
    SessionStateMachine: L1RSM;
    SBM={BM1, BM2, . . . , BMx} is a set of labeled pre-defined models;
The output is SessionModels that is a subset of SBM such that each element of the subset closely matches with L1RSM;
For each BMi in SBM
Step 1: Perform Structural Matching to obtain Si;
Step 2: Perform Temporal Matching to obtain Ti;
Step 3: Compute Di as W1*Si+W2*Ti; Di is the overall matching error associated with BMi;
Order BMi's based on Di's;
Select a pre-defined number of models BMm's with best Dm's that is within a pre-defined threshold as SessionModels;
Observe that the matching is based on two aspects: Structural aspect and temporal aspect. When two RSMs are matched against each other, structural and temporal matching is performed at both levels: matching of level 1 structural aspects; matching of level 1 temporal aspects; matching of level 2 structural aspects; and matching of level 2 temporal aspects.
Structural Matching
    For each node N1 in BMi
Step 1: Find the corresponding node N2 in L1RSM;
Step 2: Obtain <N, T, E> associated with N1;
Step 3: Obtain <N', T', E'> associated with N2;
Step 4: Find distance X1 between N1 and N2 based on <N, T, E> and <N', T', E'>;

Step 5: Let L2R(N1) be the L2RSM associated with N1;
Step 6: Let L2R(N2) be the L2RSM associated with N2;
//Find the structure based distance Y1 between L2R(N1) and L2R(N2) by iterating //over the structure
Step 7: For each node N11 in L2R(N1)
Step 7a: Find the corresponding node N12 in L2R(N2)
Step 7b: Obtain <N, T, E> associated with N11;
Step 7c: Obtain <N', T', E'> associated with N12;
Step 7d: Find distance Y1 between N11 and N12 based on <N, T, E> and <N', T', E'>;
Step 7e: Add Y1 to Y;
Step 8: Add X1, Y to Si;
Note that Si is the overall structural matching error associated with BMi.

FIG. 7a provides an approach for session matching based on temporal properties.

The input for temporal matching are a pre-defined model BMi and a session state machine L1RSM;

The output is a measure Ti based on temporal matching;

Temporal Matching

Let BMiSeq be a temporal sequence associated with BMi without considering the L2RSMs associated with the nodes of BMi;

Let L1Seq be a temporal sequence associated with L1RSM without considering the associated L2RSMs with the nodes of L1RSm;

Apply a warping technique based on, say, dynamic programming, to determine minimum matching error; use a distance measure based on <N, T, E> associated with the nodes of BMiSeq and L1Seq, and distance between a pair of meta-events based on a distance metric;

Let TE1 be the minimum match error;

For each node Ni in BMi
Step 1: Find the corresponding node N2 in L1RSM;
Step 2: Let L2R(N1) be the L2RSM associated with N1;
Step 3: Let L2R(N2) be the L2RSM associated with N2;
Step 4: Let L2R(N1)Seq be a temporal sequence associated with L2R(N1);
Step 5: Let L2R(N2)Seq be a temporal sequence associated with L2R(N2);
Step 6: Apply a warping technique based on, say, dynamic programming, to determine minimum matching error; use a distance measure based on <N, T, E> associated with the nodes of L2R(N1)Seq and L2R(N2)Seq, and distance between a pair of basic events based on a distance metric;
Step 7: Let E2 be the minimum match error;
Step 8: Add E2 to TE2;
Ti=TE1+TE2; Ti is the overall temporal matching error associated with BMi;

FIG. 8 provides an approach for session merging. The session merging is to achieve in identifying an abstract model given a plurality of session models.

Given: A plurality of session models SL1RSM={L11, L12, . . . , L1x}, identify an abstract model, L1M // Level 1 Structural Merging
For each node N1 in L11,
Step 1: Obtain <N1, T1, E1> associated with Ni;
Step 2: Obtain a plurality of <Ni, Ti, Ei>'s associated with the node corresponding to Ni in session models L12, . . . , L1x;
Step 3: Compute <Ni', Ti', Ei'> as the centroid of <Ni, Ti, Ei> with 1<=I<=X and associate the same with Ni of L1M;

// Level 1 Time Distribution
For each node Ni in L1M,
Step 1: Obtain <Ni, Ti, Ei> associated with Ni;
Step 2: Obtain the sequence <<TS11, TE11> . . . <TS1y, TE1y>> associated with the node N1' of L11, wherein N1' corresponds with Ni;
Step 3: Obtain the sequences associated with the node corresponding to Ni in session models L12, . . . , L1x;
Step 4: Based on the above time sequences, determine a sequence that has least mismatch error and is closely consistent with <Ni, Ti, Ei>;
This results in time sequence indicating the visits to Ni;
Step 5: Associate this time sequence with Ni of L1M;

//Adjusting for Inconsistency
Compute an inconsistency measure based on the plurality of <N, T, E>'s associated with the nodes of L1M; Note that the inconsistency measure accounts for both structural and temporal inconsistency associated with L1M;
Adjust minimally the plurality of <N, T, E>'s associated with the nodes of L1M to account for the inconsistency measure;

// Constraint Based Level 2 Merging
For each node Ni in L1M,
Step 1: Obtain SL2RSM containing a plurality of L2RSM's associated with the node corresponding to Ni in session models L11, l12, . . . , L1x;
Step 2: Obtain the sequence TS=<<TSi1, TEi1>, . . . , <TSiy, TEiy>> associated with Ni;
Step 3: For each L2RSM in SL2RSM,
Step 3a: Bind L2RSM to be within TS by dropping events that are outside the bound and Modifying events if necessary;
Step 4: Cluster L2RSM's in SL2RSM based on structural and temporal similarity;
Step 5: Order clusters on their size;
Step 6: Select a pre-defined number of clusters from the top of the ordered clusters;
Step 7: Transform the absolute timestamps associated with the events to relative timestamps;
Step 8: Bind the selected clusters with relative timestamps to Ni;

FIG. 9 provides an approach for building a user-specific model. The objective is to discover a plurality of user-specific models given a plurality of session-specific state machines.

Given a plurality of session-specific state machines, SL1={L11, L12, . . . , L1x}; and let SBM={BM1, BM2, . . . , BMx} be a set of labeled pre-defined behavioral models;
Output: A plurality of abstract models, SL1M;
For each L1i in SL1,
Step 1: Determine whether L1i is close to any model in SBM;
Step 2: If not, Make L1i part of TL1;
For each L1i in TL1,
Step 1: Make L1i part of T1L1;
Step 2: For each L1j in TL1,
Step 2a: If L1j is similar to L1i, Make L1j part of T1L1;
Step 3: Session Merge based on T1L1 to generate an abstract model L1M;
Step 4: Make L1M part of SL1M;

FIG. 10 depicts illustrative results. In this case, the session data depicted in FIG. 4 and FIG. 4a are matched against models depicted in FIG. 5 and FIG. 5a. The values in the figure indicate (1—overall match error). Observe that each session data is divided into two subsessions and Session 1a matches well with Model 1 (Restlessness) while Session 1b matches best with Model 2 (Focused Watch).

FIG. 10a depicts an illustrative session data for model discovery. Observe that there are 20 sessions each depicting a sequence of events.

FIG. 10b depicts an illustrative set of clusters for model discovery. Note that these clusters are based on the analysis of data related to a plurality of sessions depicted in FIG. 10a. There are four clusters in which Cluster ID 1 has a maximum size representing information related to eight sessions.

FIG. 10c depicts an illustrative model discovery. Note that this discovered model is based on Cluster Id 1 depicted in FIG. 10b. The discovered model depicts both level-1 state machine and a level-2 state machine for each of the nodes of the level-1 state machine.

Thus, a system and method for remote control unit usage modeling is disclosed. Although the present invention has been described particularly with reference to the figures, it will be apparent to one of the ordinary skill in the art that the present invention may appear in any number of systems that identifies an interaction behavior of a user while operating and controlling a device using a remote control unit. It is further contemplated that many changes and modifications may be made by one of ordinary skill in the art without departing from the spirit and scope of the present invention.

What is claimed is:

1. A method for the modeling of a remote control unit usage with respect to an apparatus to determine a plurality of session models of a plurality of pre-defined models for describing a plurality of session data of said remote control unit usage and discovering a plurality of abstract models of said remote control unit usage based on said plurality of session data, wherein a plurality of events is associated with said plurality of session data and a plurality of meta-events is associated with said plurality of events, the said method comprising:
   determining a session-specific state machine of a plurality of session-specific state machines based on a session datum of said plurality of session data,
   performing session matching of said session-specific state machine with respect to said plurality of pre-defined models to determine a session model of a plurality of session models,
   performing session merging based on said plurality of session models to determine an abstract model of said plurality of abstract models, and
   performing model building based on said plurality of session-specific state machines to determine a plurality of built abstract models of said plurality of abstract models.

2. The method of claim 1, further comprising:
   obtaining a pre-defined model of said plurality of pre-defined models, wherein said pre-defined model comprising:
   a level-1 state machine with a plurality of level-1 nodes and a plurality of level-2 state machines with a level-2 state machine of said plurality of level-2 state machines being associated with a level-1 node of said plurality of level-1 nodes,
   wherein a level-1 node of said plurality of level-1 nodes is associated with a meta-event of said plurality of meta-events and a level-2 node of a level-2 state machine, of said plurality of level-2 state machines, associated with said level-1 node is associated with an event of said plurality of events with said event being associated with said meta-event.

3. The method of claim 2, further comprising:
   obtaining of a plurality of level-1 nodes of said level-1 state machine, a plurality of level-2 state machines of said level-1 state machine, and a plurality of plurality of level-2 nodes with a plurality of level-2 nodes of said plurality of plurality of level-2 nodes associated with a level-1 node of said plurality of level-1 nodes and also associated with a level-2 state machine of said plurality of level-2 state machines,
   wherein a level-1 node of said plurality of level-1 nodes is associated with three attributes, wherein said three attributes comprising:
   a number of visits to said level-1 node as per said level-1 state machine,
   an aggregated time of visits as per said level-1 state machine, and
   a number of edges at said level-1 node as per said level-1 state machine, and
   a level-2 node of said plurality of level-2 nodes is associated with three attributes, wherein said three attributes comprising:
   a number of visits to said level-2 node as per said level-2 state machine,
   an aggregated time of visits as per said level-2 state machine, and
   a number of edges at said level-2 node as per said level-2 state machine.

4. The method of claim 1, wherein said method of determining said session-specific state machine for said session datum of said plurality of session data further comprising:
   determining an event of said plurality of events based on said session datum,
   determining a meta-event of said plurality of meta-events, wherein said meta-event corresponds to said event,
   creating a first node in said session-specific state machine, wherein said first node corresponds to said meta-event,
   locating said first node in said session-specific state machine,
   creating a level-2 state machine, wherein level-2 state machine corresponds to said first node,
   creating a second node in said level-2 state machine, wherein said second node corresponds to said event,
   locating said second node in said level-2 state machine,
   determining a plurality of attributes of said event,
   updating said second node with said plurality of attributes,
   updating three attributes of said second node, and
   updating three attributes of said first node.

5. The method of claim 4, wherein said method further comprising:
   determining a level-1 node of said session-specific state machine,
   determining a level-2 state machine associated with said level-1 node,
   computing a typical three attributes associated with said level-2 state machine based on factors comprising: a plurality of three attributes associated with a plurality of level-2 nodes of said level-2 state machine, a meta-event associated with said level-1 node,
   and a plurality of events associated with said plurality of level-2 nodes,
   determining a second level-2 node of said level-2 state machine,
   determining a three attributes associated with said second level-2 node,
   computing a deviation associated with said second level-2 node based on said three attributes and said typical value of three attributes,
   marking said second level-2 node for deletion if said deviation is greater than a pre-defined threshold.

6. The method of claim 4, further comprising:
   determining a level-1 node of said session-specific state machine,
   determining a level-2 state machine associated with said level-1 node,
   determining a plurality of marked level-2 nodes of said level-2 state machine, wherein each of said plurality of marked level-2 nodes is marked for deletion, arranging said plurality of marked level-2 nodes based on a deviation associated with each of said plurality of marked level-2 nodes, selecting a plurality of to-be-deleted level-2 nodes based on a deviation associated with a node of said plurality of marked level-2 nodes and a pre-defined threshold, and deleting said plurality of to-be-deleted nodes from said level-2 state machine.

7. The method of claim 1, wherein said method of performing session matching further comprising:

computing a level-1 structural match error based on a level-1 session state machine associated with said session-specific state machine and a level-1 model state machine associated with a pre-defined model of said plurality of pre-defined models, computing a level-2 structural match error based on a plurality of level-2 session state machines associated with said level-1 session state machine and a plurality of level-2 model state machines associated with said level-1 model state machine, computing a level-1 temporal match error based on said level-1 session state machine and said level-1 model state machine, computing a level-2 temporal match error based on a plurality of level-2 session state machines associated with said level-1 session state machine and a plurality of level-2 model state machines associated with said level-1 model state machine, computing an overall match error of a plurality of overall match errors based on said level-1 structural match error, said level-2 structural match error, said level-1 temporal match error, and said level-2 temporal match error, determining a pre-defined model of said plurality of pre-defined models based on said plurality of overall match errors, and making said pre-defined model as said session model.

8. The method of claim 7, further comprising:

determining a level-1 session node of said level-1 session state machine, determining a level-1 model node of said level-1 model state machine, wherein said level-1 model node corresponds with said level-1 session node, determining a session node three attributes of said level-1 session node, determining a model node three attributes of said level-1 model node, computing a node match error based on said session node three attributes and said model node three attributes, and computing said level-1 structural match error based on said node match error associated with each node of said level-1 model state machine.

9. The method of claim 7, further comprising:

determining a level-2 model node of a level-2 model state machine of a level-1 model node of said level-1 model state machine, determining a level-2 session node of a level-2 session state machine of a level-1 session node of said level-1 session state machine, wherein said level-1 session node corresponds with said level-1 model node and said level-2 session node corresponds with said level-2 model node, determining a session node three attributes of said level-2 session node, determining a model node three attributes of said level-2 model node, and computing a node match error based on said session node three attributes and said model node three attributes, and computing said level-2 structural match error based on said node match error associated with each node of each level-2 model state machine of a plurality of level-2 model state machines associated with said level-1 model state machine.

10. The method of claim 7, further comprising:

determining a level-1 model temporal sequence of said level-1 model state machine, wherein said level-1 model temporal sequence excludes a plurality of level-2 model state machines associated with a plurality of model nodes of said level-1 model state machine, determining a level-1 session temporal sequence of said level-1 session state machine, wherein said level-1 session temporal sequence excludes a plurality of level-2 session state machines associated with a plurality of session nodes of said level-1 session state machine, and computing said level-1 temporal match error by applying of a warping technique based on a three attributes associated with each of a plurality of model nodes of said level-1 model temporal sequence, three attributes associated with each of a plurality session nodes of said level-1 session temporal sequence, a meta-event of said plurality of meta-events associated with each of said plurality of model nodes, and a meta-event of said plurality of meta-events associated with each of said plurality of session nodes.

11. The method of claim 7, further comprising:

determining a level-2 model temporal sequence of a level-2 model state machine of a level-1 model node of said level-1 model state machine, determining a level-2 session temporal sequence of a level-2 session state machine of a level-1 session node of said leve-1 session state machine, wherein said leve-1 session node corresponds with said level-1 model node, computing a state machine match error by applying of a warping technique based on three attributes associated with each of a plurality of model nodes of said level-2 model temporal sequence, three attributes associated with each of a plurality session nodes of said level-2 session temporal sequence, an event of said plurality of events associated with each of said plurality of model nodes, and an event of said plurality of events associated with each of said plurality of session nodes, and computing said level-2 temporal match error based on said state machine match error associated with each level-2 model state machine of a plurality of level-2 model state machines associated with said level-1 model state machine and said level-1 session state machine.

12. The method of claim 1, wherein said method of performing of session merging further comprising:

determining a session model of said plurality of session models, determining a session node of said session models, determining three attributes associated with said session node;

determining a session model 1 of said plurality of session models;

determining three attributes, of a plurality of three attributes, associated with a node 1 of said session model 1, wherein said node 1 corresponds with said session node;

computing a model three attributes based on said three attributes and said plurality of three attributes, and making said model three attributes a part of a model node of said abstract model, wherein said model node corresponds with said session.

13. The method of claim 12, further comprising:
determining a model node of said abstract model,
determining three attributes associated with said model node,
determining a plurality of nodes, wherein a node of said plurality of nodes is a part of a session model of said plurality of session models and said node corresponds with said model node,
determining a plurality of plurality of time intervals associated with said plurality of nodes,
computing a plurality of model time intervals based on said plurality of plurality of intervals, wherein said plurality of model intervals matches best with each of said plurality of plurality of time intervals and said plurality of model time intervals is closely consistent with said three attributes, and
making said plurality of model intervals a part of said model node.

14. The method of claim 12, further comprising:
determining a plurality of model nodes of said abstract model,
determining a plurality of three attributes associated with said plurality of model nodes,
computing an inconsistency measure based on said plurality of three attributes, wherein said inconsistency measure accounts for structural inconsistency associated with said abstract model and temporal inconsistency associated with said abstract model, and
adjusting said plurality of three attributes minimally based on said inconsistency measure.

15. The method of claim 12, further comprising:
determining a model node of said abstract model,
determining a plurality of nodes, wherein a node of said plurality of nodes is a part of a session model of said plurality of session models and corresponds with said model node;
determining a plurality of level-2 state machines based on said plurality of nodes;
determining a plurality of level-1 time intervals associated with said model node,
modifying a plurality of level-2 time intervals associated with each of said plurality of level-2 state machines based on said plurality of level-1 time intervals resulting in a plurality modified level-2 state machines,
clustering said plurality of modified level-2 state machines based on structural similarity and temporal similarity into a plurality of level-2 state machine clusters,
ordering said plurality of level-2 state machine clusters based on size of each of said plurality of level-2 state machine clusters into a plurality of ordered level-2 state machine clusters,
selecting a pre-defined number of clusters from the top of said plurality of ordered level-2 state machine clusters,
transforming a timestamp associated with each of a plurality of events of each of a plurality of level-2 state machines of each of said pre-defined number of clusters; and
binding said pre-defined number of clusters to said model node.

16. The method of claim 1, wherein said method of performing model building further comprising:
computing a plurality of non-close session-specific state machines, wherein each of said plurality of non-close session-specific state machines is not similar to any model of said plurality of pre-defined models,
computing a plurality of similar non-close session-specific state machines, wherein each of said plurality of similar non-close session-specific state machines is similar to a session-specific state machine of said plurality of similar non-close session-specific state machines, and
performing session merging of said plurality of similar non-close session-specific state machines resulting in a built abstract model of said plurality of built abstract models.

* * * * *